Oct. 21, 1952 E. D. GRIZZARD ET AL 2,614,871
ANCHOR FOR CARGO TIE-DOWN DEVICES
Filed June 30, 1951
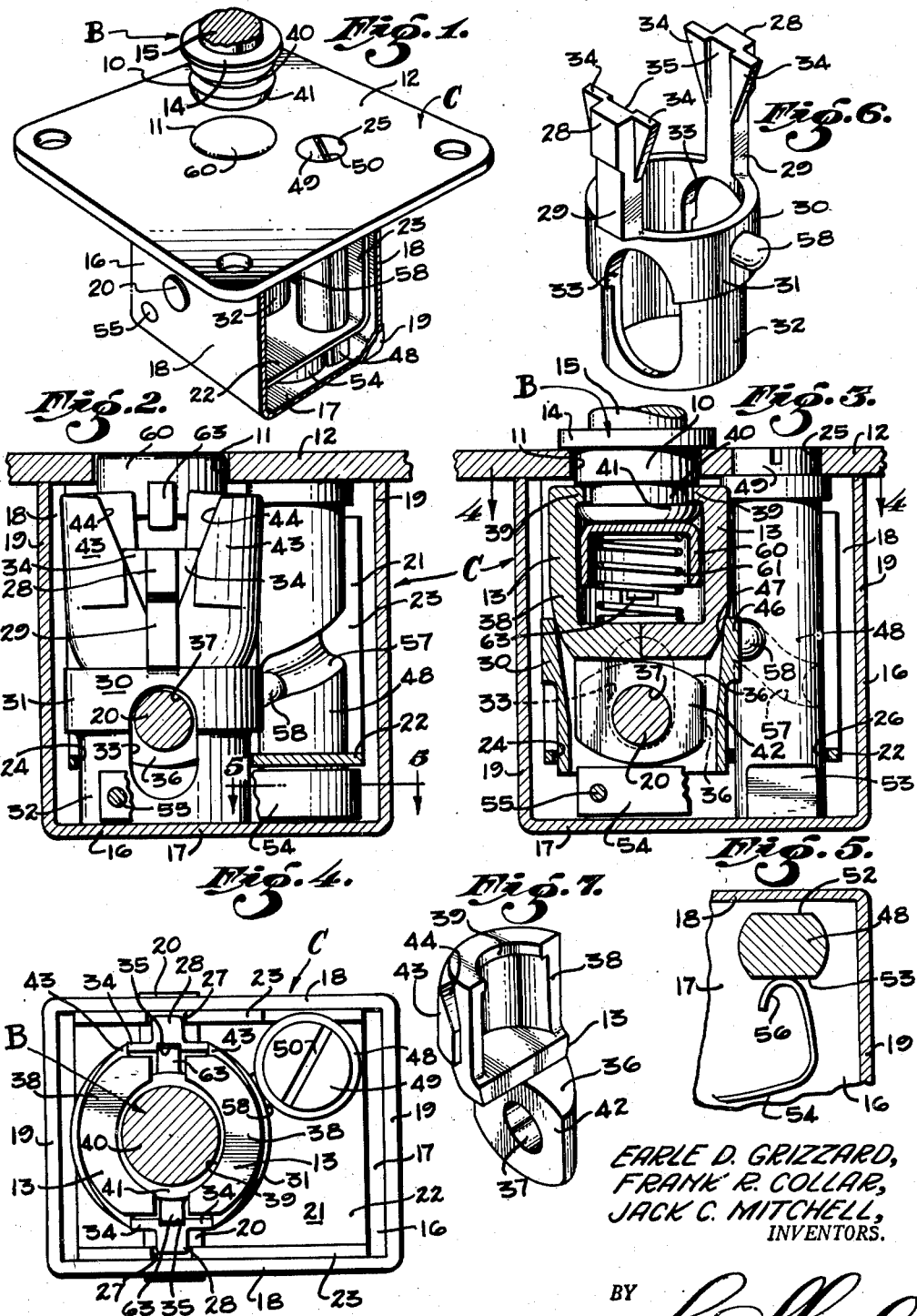
EARLE D. GRIZZARD,
FRANK R. COLLAR,
JACK C. MITCHELL,
INVENTORS.
BY
ATTORNEY Patented Oct. 21, 1952

2,614,871

UNITED STATES PATENT OFFICE 2,614,871

ANCHOR FOR CARGO TIE-DOWN DEVICES

Earle D. Grizzard and Frank R. Collar, Los Angeles, and Jack C. Mitchell, La Crescenta, Calif., assignors to Adams Rite Manufacturing Company, Glendale, Calif., a corporation of California Application June 30, 1951, Serial No. 234,562

12 Claims. (Cl. 287—20.5)

Our invention relates to a detachable connector for use in tying down cargo so that it will not move during shipment, and is particularly useful as a means for securing cargo or other removable parts in aircraft.

It is an object of the invention to provide a releasable connection having a connector part which is adapted to be mounted in a wall, such as the floor, side-wall or ceiling of a chamber in an aircraft, having means for engaging a shouldered body which is employed for the purpose of securing or tying down the cargo or other part which is to be held rigidly in place, this releasable connection having a simple and positive locking means which is easy to operate yet secures the connector parts together without danger of accidental disengagement.

It is an object of the invention to provide for use with a shouldered connector body, a detachable connector means arranged to be secured to or in a wall, this connector means having an opening to receive the shouldered body, means lying adjacent the opening for engaging the shouldered connector body and a closure member which closes the opening when the shouldered connector body is removed therefrom. The wall-mounted connector structure is adapted to be used as a permanent fixture and is arranged so that it may be mounted with its front wall flush with the wall surface of the chamber. The opening which is adapted to receive the shouldered connector part is closed by the closure member positioned so that its outer face is flush with the wall.

A further object of the invention is to provide in the detachable connector structure lever members which are arranged on opposite sides of and substantially parallel to the axis of the opening which receives the shouldered connector body, these lever members being supported so that their outer ends may swing toward and away from the axis of the opening, there being shoulders associated with the other ends of the lever members for engagement with the shoulder of the shouldered body, to secure the same in the opening of the detachable connector structure.

A further object of the invention is to provide in the detachable connector structure, means for actuating the lever members, this means including a part which moves in a direction substantially parallel to the axis of the opening which receives the shouldered connector body, and a member which is operable from the exterior of the structure and is arranged to effect movement of the part. A feature of the invention is that the movable part has a portion arranged to move the lever members toward the axis of the opening when the part is moved in one of its direction of movement, and means for spreading or releasing the lever members when the part is moved in the opposite direction.

A further object of the invention is to provide a rotatable cam member, provided with a helically disposed cam shoulder, and means arranged to be moved by this cam shoulder in response to rotation of the cam member to accomplish opening and closing movement of the lever members with relation to the shouldered connector body which is inserted through the opening of the detachable connector structure.

Further objects and advantages of the invention will be brought out in the following part of the specification wherein the details of a preferred embodiment of the invention have been described for the purpose of disclosure and not for the purpose of limiting the scope of the invention which is set forth in the appended claims and without limiting the range of equivalence to which the claims are entitled.

Referring to the drawings which are for illustrative purposes only:

Fig. 1 is a perspective view partly in cross-section showing a preferred embodiment of the invention;

Fig. 2 is an enlarged fragmentary sectional view showing the internal mechanism of the detachable connector structure, with the levers thereof in separated relation and with the closure member positioned so as to close the connector body receiving opening of the structure;

Fig. 3 is a fragmentary sectional view similar to Fig. 2 but showing the levers or jaws thereof engaging a connector body which has been inserted through the opening intended therefor;

Fig. 4 is a sectional view taken on the plane of the lower face of the top wall of the detachable engagement structure, as indicated at 4—4 in Fig. 3;

Fig. 5 is a fragmentary sectional view taken as indicated on the line 5—5 of Fig. 2 to show the arrangement of the spring detent;

Fig. 6 is a perspective view, to enlarged scale of the part which opens and closes the lever or jaw members; and Fig. 7 is a perspective view of one of the lever or jaw members of the invention.

In the preferred form of the invention disclosed in the drawing we provide a detachable connector C which is arranged to be mounted in a wall, such as a floor, side-wall or ceiling of a chamber in which a part is to be secured, and connector body B having a head portion 10 arranged to be passed through an opening 11 in the front wall 12 of the connector structure C, by movement of the conector body B from the position in which it is shown in Fig. 1 to the position in which it is shown in Fig. 3. When the head 10 has been moved through the opening 11 as shown in Fig. 3, it may be engaged by lever or jaw members 13. The detachable connector body B has a flange 14 which rests against the outer face of the wall 12 when the head 10 is inserted through the opening 11, and has an outwardly projecting stem 15, only a portion of which is shown, which stem 15 may be connected in any desired manner to a part which is to be secured to the connector structure C. For example, the stem 15 may be connected directly to a part, such as a container, or a mechanism, or the stem 15 may be connected to a strap bar or clevis such as employed in the securing or tying down of cargo or equipment. The connector C includes a housing 16 which is connected to the rear face of the front wall 12 by some suitable means such as spot welding. This housing 16 has a back wall 17 which is spaced from and substantially parallel to the front wall 12, front and rear walls 18 and side walls 19, one of these side walls 19 being removed from Fig. 1 so as to show underlying parts. A hinge pin 20 is secured in the frame of the connector C in parallel relation to the front wall 12 and so as to cross the axis of the opening 11. This pin 20 extends across the housing 16 and has its ends seated in openings in the front and rear walls 18. A metal insert 21 is disposed in the housing 16. This metal insert has a back wall 22 spaced from the back wall 17 of the housing 16, and front and rear walls 23 which engage the front and rear walls 18 of the housing 16. As best shown in Figs. 2 and 3, the back wall 22 of the insert 21 has an opening 24 aligned with the opening 11 in the front wall 12. The front wall 12 has a second opening 25 offset from the opening 11 and the back wall 22 has an opening 26 aligned with the opening 25. The ends of the pin 20 pass likewise through the front and rear walls of the insert 21. As shown in Fig. 4 these front and rear walls 23 have therein slots 27 parallel to the axis of the opening 11 to form guide ways for lateral projections 28 formed on the forwardly (upwardly) extending arms 29 of a lever operating member 30, which is shown in perspective in Fig. 6. The lever operating member 30 has a cylindric wall 31 from which the arms 29 forwardly extend, the lower portion 32 of this cylindrical wall passing through and being slidable in the opening 24, as shown in Figs. 2 and 3. The cylindric wall 31 has diametrally opposed, axially elongated openings 33 through which portions of the pin 20 pass, and the outer portions of the arms 29 are provided with wedge members 34 and shallow guide ways 35 positioned between the wedge members 34.

The levers 13 are identical in form as shown in Fig. 7, they each include a stem portion 36 which is semi-cylindrical in cross-section and has a pin opening 37. Extending from the stem portion 36 there is a hollow semi-cylindrical cup portion 38 having at the outer end thereof an inwardly extending flange or shoulder 69 of such size that it will enter a channel 40 formed in the head 10, as shown in Fig. 3, at which time this shoulder 39 will be positioned so as to engage the annular shoulder 41 on the head of the connector body B. Referring to Fig. 7, when a lever member 13 such as shown therein, is rotated 180° around the axis of the cylindrical cup portion 38, such lever member may be placed with relation to the lever member 13 shown in Fig. 7 so that the cup portions 38 will lie in facing relation as shown in Fig. 4 and will define a hollow cylindric body. At this time the diametral faces 42 of the stem portions 36 will be in engagement and the pin openings 37 of the stem portions 36 will be axially aligned. It is in this relation that the levers 13 are mounted upon the pin 20, with the stem portions 36 thereof projecting downwardly or rearwardly into the cylindrical wall 31 of the lever operating member 30. The cylindrical or cup portions 38 of the levers 13 have thereon projections 43 defining sloping faces 44 arranged to be engaged by the wedge members 34 of the actuating member 30.

The actuating member 30 has operative movement along the axis of the openings 11 and 24, between the position in which the member 30 is shown in Fig. 2 and that in which it is shown in Fig. 3. When the actuating member is in the rearward position in which it is shown in Fig. 2, the wedge members 34 thereof act upon the faces 44 of the levers 13 and force the forward or cup portions 38 of the levers 13 apart, removing the shoulders 39 thereof from positions for engagement with the shoulder 41 of the head 10. Therefore, at this time the forward portions of the levers 13 are separated and the head 10 may be passed through the opening 11, to bring the groove or channel 40 thereof into alignment with the separated shoulders 39, and to bring the annular shoulder 41 into a position inwardly of the shoulders 39. When the lever operating member 30 is moved forwardly into the position in which it is shown in Fig. 3, the front portion 46 of the cylindrical wall 31 engages the roundingly tapered rearward end faces 47 of the cup members 38 and causes the lever 13 to swing toward the axis of the opening 11 and into engaging position as shown in Fig. 3 whereupon the shoulders 39 will enter the annular groove 40 of a head 10 which has been inserted through the opening 11.

The invention provides means for moving the lever operating member 30 forwardly and rearwardly. This means includes a rotatable part 48, consisting of a pin having a forward portion 49 which substantially fills the opening 25 in the front wall 12 and is provided with a slot 50 adapted to be engaged by a screw driver to rotate the pin 48. The rearward portion of the pin 48 projects through the opening 26 and has flattened faces 52 and 32 formed thereon rearwardly of the wall 42. A leaf spring 54 has one end thereof secured to the wall 18 by means such as a rivet 55 and has its swingable end 56 positioned for engagement with the flat faces 52 and 53, respectively, so as to yieldably restrain the pin 48 from rotation and to hold the pin in the extreme operative positions thereof. The pin 48 has helically disposed cam means in the form of a slot 57 which receives a cam follower 58 consisting of a lug or pin projecting from the cylindrical wall 31 of the lever operating member 30. When the pin 48 is rotated in counter-clockwise direction from the position in which it is shown in Fig. 3, the shoulders along the sides of the cam slot 57 will act upon the follower 58 so as to move the member 30 rearwardly from the position in which it is shown in Fig. 3 to the position in which it is shown in Fig. 2. This will result in the spreading of the forward ends of the levers 13 so that the head 10 of the connector body B may be removed from engagement with the detachable connector structure C.

A closure for the opening 11, when the head 10 is removed therefrom, is provided. As shown in Fig. 3, this closure consists of an inverted cup 60 which is positioned in the cavities of the cup portions 38 of the levers 13 when the head 10 is inserted as shown in Fig. 3. A compression spring 61 is disposed within the cup 60 so as to urge the same outwardly into the position in which it is shown in Figs. 1 and 2 to fill the opening 11 when the head 10 is removed therefrom. The closure or cup 60 has diametrally projecting lugs 63, as shown in Figs. 2 and 4, these lugs being adapted to move in the guide ways 35 of the arms 29, and as indicated in Fig. 2, these lugs 63 are positioned so that the front faces thereof will engage the inner face of the front wall 12 and thereby limit outward movement of the cup 60 to a position wherein the front face of the cup 60 will be flush with the front face of the wall 12. Referring to Fig. 1, when the connector body B is moved from the position in which it is shown so as to cause the head 10 to enter the opening 11, the head 10 will move the closure or cup 60 inwardly from the position in which it is shown in Figs. 1 and 2, against the yieldable force of the spring 61, thereby returning the cup 60 to the position in which it is shown in Fig. 3 when the head 10 is fully inserted and is adapted to be locked in place by the shoulders 39 of the levers 13.

We claim:

1. In a detachable connector for a shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; and means operative through said second opening to move said lever means toward said axis of said first opening.

2. In a detachable connector for a shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; means operative through said second opening to move said lever means toward said axis of said first opening; and closure means disposed in said frame within said first opening and being movable outwardly into said first opening so as to close the same when said shouldered connector body is removed from said first opening and said lever means is swung away from the axis of said first opening.

3. In a detachable connector for a shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; an annular member disposed around said lever means and being movable toward and away from said front wall, said annular member being arranged to move said lever means toward axis of said first opening so that said lever means will engage said shouldered connector body inserted in said first opening; and means operative through said second opening to move said annular member toward and away from said front wall.

4. In a detachable connector for a shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; an annular member disposed around said lever means and being movable toward and away from said front wall, said annular member being arranged to move said lever means toward axis of said first opening so that said lever means will engage said shouldered connector body inserted in said first opening; means operative through said second opening to move said annular member toward and away from said front wall; and closure means disposed in said frame within said first opening and being movable outwardly into said first opening so as to close the same when said shouldered connector body is removed from said first opening and said lever means is swung away from the axis of said first opening.

5. In a detachable connector for a shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; a rotatable member aligned with the axis of said second opening, said rotatable member being operable from the exterior of said frame; and means operated by rotation of said rotatable member to move said lever means toward said axis of said first opening whereby said lever means will be positioned for engagement with said shouldered connector body inserted in said first opening.

6. In a detachable connector for shouldered connector body: a frame having a front wall with a first opening therein to receive said shouldered body, and having a second opening disposed to one side of said first opening; hinge means carried by said frame in spaced relation and parallel to said wall; lever means mounted on said hinge means so as to swing toward and away from the axis of said first opening, said lever means being shouldered so as to engage said shouldered connector body when it is inserted in said first opening; a lever operating member mounted within said frame so as to move toward and away from said front wall; a rotatable member mounted in said frame in alignment with said second opening, said rotatable member having a helically disposed shoulder, said rotatable member being operable from the exterior of said frame; and means engaging said helically disposed shoulder of said rotatable member so as to be moved in response to rotation of said rotatable member, said last named means being connected to said lever operating member so that it will move said lever operating member and thereby operate said lever means.

7. In a detachable connector for a shouldered connector body: a frame having a front wall with a first opening therein to receive said shouldered body, and having a second opening disposed to one side of said first opening; hinge means carried by said frame in spaced relation and parallel to said walls; lever means mounted on said hinge means so as to swing toward and away from the axis of said first opening, said lever means being shouldered so as to engage said shouldered connector body when it is inserted in said first opening; a lever operating member mounted within said frame so as to move toward and away from said front wall; a rotatable member mounted in said frame in alignment with said second opening, said rotatable member having a helically disposed shoulder, said rotatable member being operable from the exterior of said frame; means engaging said helically disposed shoulder of said rotatable member so as to be moved in response to rotation of said rotatable member with said last named means being connected to said lever operating member so that it will move said lever operating member and thereby operate said lever means; and closure means disposed in said frame within said first opening and being movable outwardly into said first opening so as to close the same when said shouldered connector body is removed from said first opening and said lever means is swung away from the axis of said first opening.

8. In a detachable connector for a shouldered connector body: a frame having a front wall with a first opening therein to receive said shouldered body, and having a second opening disposed to one side of said first opening; lever means supported in said frame on opposite sides of the axis of said first opening so that the outer ends of said lever means will be movable toward and away from the axis of said first opening, said lever means being shouldered so as to engage said shouldered connector body when it is inserted in said first opening; and means operative through said second opening to move said lever means toward said axis of said first opening.

9. In a detachable connector for a shouldered connector body: a frame having a front wall with a first opening therein to receive said shouldered body, and having a second opening disposed to one side of said first opening; lever means supported in said frame on opposite sides of the axis of said first opening so that the outer ends of said lever means will be movable toward and away from the axis of said first opening, said lever means being shouldered so as to engage said shouldered connector body when it is inserted in said first opening; means operative through said second opening to move said lever means toward said axis of said first opening; and closure means disposed in said frame within said first opening and being movable outwardly into said first opening so as to close the same when said shouldered connector body is removed from said first opening and said lever means is swung away from the axis of said first opening.

10. In a detachable connector for a shouldered connector body: a frame having a front wall with a first opening therein to receive said shouldered body, and having a second opening disposed to one side of said first opening: lever means supported in said frame on opposite sides of the axis of said first opening so that the outer ends of said lever means will be movable toward and away from the axis of said first opening, said lever means being shouldered so as to engage said shouldered connector body when it is inserted in said first opening; an annular member disposed around said lever means and being movable toward and away from said front wall, said annular member being arranged to move said lever means toward said axis of said first opening so that said lever means will engage said shouldered connector body inserted in said first opening; means operative through said second opening to move said annular member toward and away from said front wall; and closure means disposed in said frame within said first opening and being movable outwardly into said first opening so as to close the same when said shouldered connector body is removed from said first opening and said lever means is swung away from the axis of said first opening.

11. In a detachable connector for a shouldered connector body: a frame having a front wall with a first opening therein to receive said shouldered body, and having a second opening disposed to one side of said first opening; lever means supported in said frame on opposite sides of the axis of said first opening so that the outer ends of said lever means will be movable toward and away from the axis of said first opening, said lever means being shouldered so as to engage said shouldered connector body when it is inserted in said first opening; a lever operating member mounted within said frame so as to move toward and away from said front wall; a rotatable member mounted in said frame in alignment with said second opening, said rotatable member having a helically disposed shoulder, said rotatable member being operable from the exterior of said frame; and means engaging said helically disposed shoulder of said rotatable member so as to be moved in response to rotation of said rotatable member, said last named means being connected to said lever operating member so that it will move said lever operating member and thereby operate said lever means.

12. In a detachable connector for a shouldered connector body: a frame having a front wall with a first opening therein to receive said shouldered body, and having a second opening disposed to one side of said first opening; lever means supported in said frame on opposite sides of the axis of said first opening so that the outer ends of said lever means will be movable toward and away from the axis of said first opening, said lever means being shouldered so as to engage said shouldered connector body when it is inserted in said first opening; a lever operating member mounted within said frame so as to move toward and away from said front wall; a rotatable member mounted in said frame in alignment with said second opening, said rotatable member having a helically disposed shoulder, said rotatable member being operable from the exterior of said frame; means engaging said helically disposed shoulder of said rotatable member so as to be moved in response to rotation of said rotatable member said last named means being connected to said lever operating member so that it will move said lever operating member and thereby operate said lever means; and closure means disposed in said frame within said first opening and being movable outwardly into said first opening so as to close the same when said shouldered connector body is removed from said first opening and said lever means is swung away from the axis of said first opening.

EARLE D. GRIZZARD.
FRANK R. COLLAR.
JACK C. MITCHELL.

No references cited.